United States Patent [19]
Humphrey

[11] 3,793,735
[45] Feb. 26, 1974

[54] LEVELLING INSTRUMENT
[76] Inventor: David H. Humphrey, General P.O. Box 2226, San Juan, P.R.
[22] Filed: May 10, 1972
[21] Appl. No.: 252,339

[52] U.S. Cl.................. 33/348, 33/379, 33/391
[51] Int. Cl............................................. G01c 9/00
[58] Field of Search..... 33/348, 354, 353, 366, 379, 33/391; 356/149

[56] References Cited
UNITED STATES PATENTS
| | | | |
|---|---|---|---|
| 1,820,791 | 8/1931 | Forrest | 33/348 |
| 2,372,091 | 3/1945 | Land | 33/348 X |
| 2,831,266 | 4/1958 | Dorn et al. | 33/348 |
| 3,221,414 | 12/1965 | Murayama | 33/348 |
| 3,192,375 | 6/1965 | Olson | 33/348 X |

Primary Examiner—William D. Martin, Jr.
Attorney, Agent, or Firm—Molinaire, Allegretti, Newitt & Witcoff

[57] ABSTRACT

A levelling instrument wherein a level condition is indicated by the projection of a light beam within the instrument on an indicator. The light beam is projected in a constant vertical direction by a reflecting surface that is rotatable about a light source, which is focused on the indicator only when the instrument is level. The reflecting surface can comprise a pendulum mirror or a continuous circular conduit partially filled with mercury.

15 Claims, 13 Drawing Figures

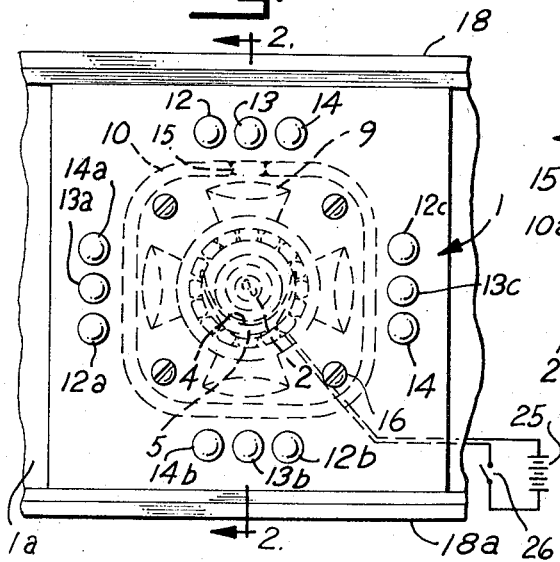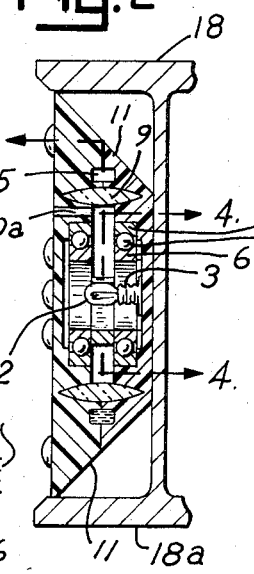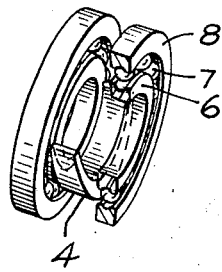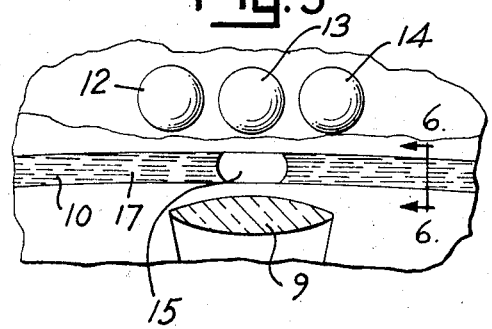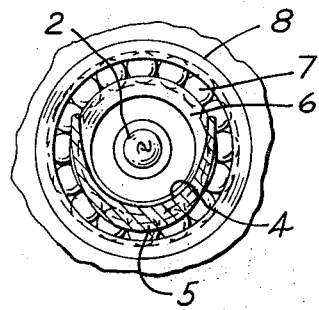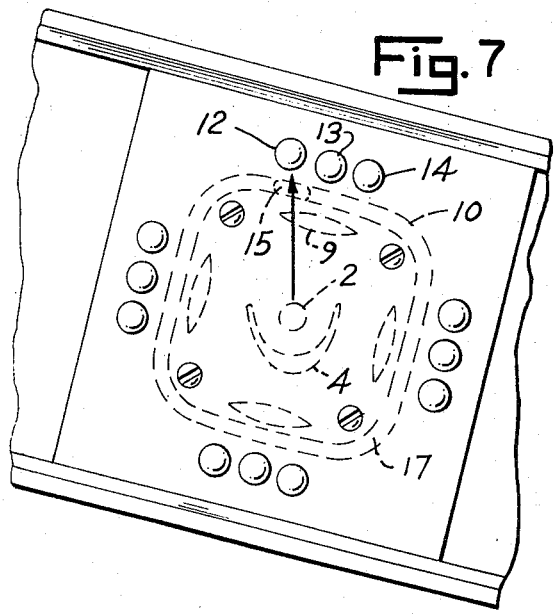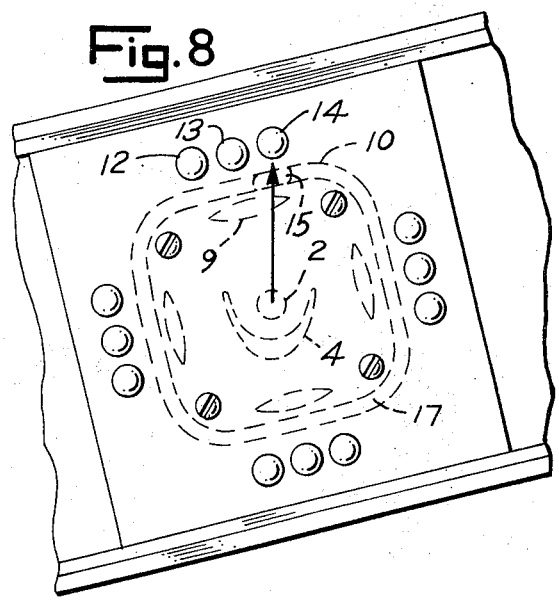

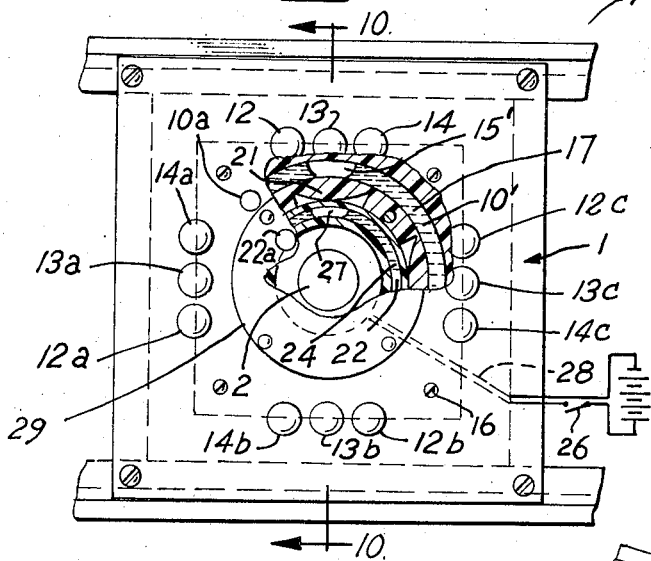
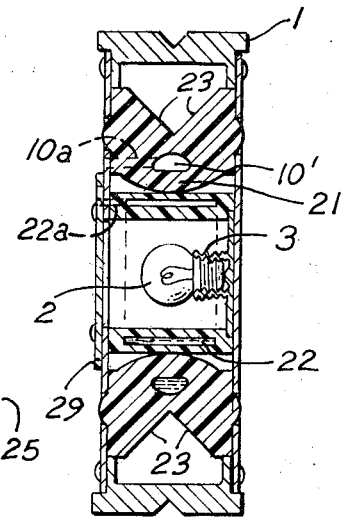
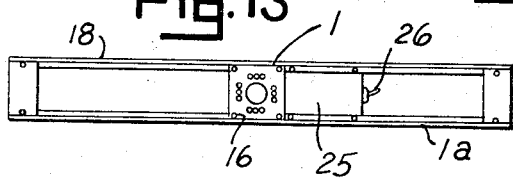
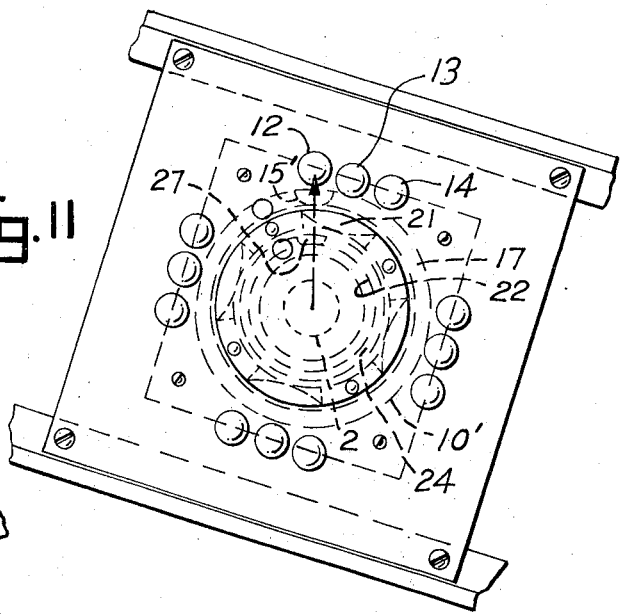
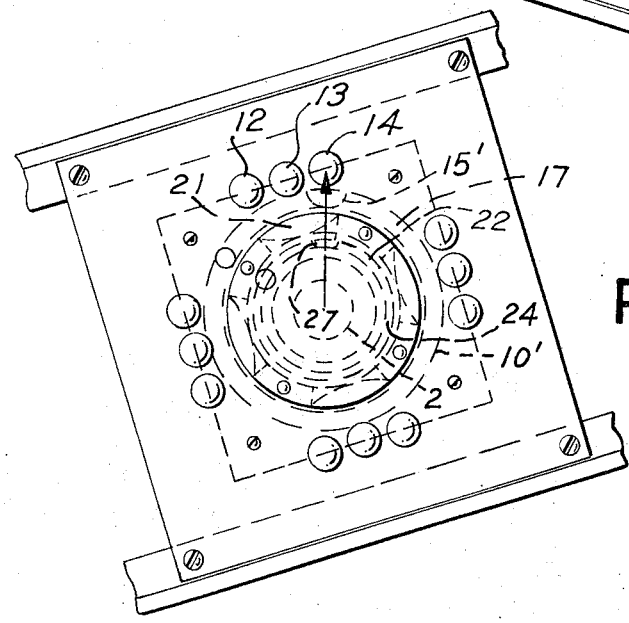

LEVELLING INSTRUMENT

BACKGROUND OF TE INVENTION

This invention relates to a levelling instrument, particularly a levelling instrument having means for readily determining whether the instrument is in a true level or plumb position.

Levelling instruments (commonly referred to in the art as levels) typically employ a visual responsive liquid-filled vial containing a bubble. The vial is slightly curved and a level condition is determined by visually observing the position of the bubble between a pair of lines which are spaced apart a predetermined distance. This method of determining a level condition is often subject to error due to inaccuracy in reading the bubble. For example, a levelling instrument is often utilized in areas of poor light or where the level vial is difficult to view because of the particular position of the level and the user.

In may U. S. Pat. No. 3,597,090 the teachings of which are incorporated by reference herein, there is disclosed a levelling instrument wherein a level condition is indicated by the projection of light beams on a pair of projection screens. The beams are directed by a square pendulum having reflective surfaces. A level condition with this levelling instrument is readily observed from a wide variety of angles, distances and light intensities. I have now developed an improved levelling instrument which provides similar benefits of readability and which is readily constructed.

SUMMARY OF THE INVENTION

It is an object of this invention to provide a levelling instrument utilizing a reflecting surface that is rotatable about a light source and which projects light beams to an indicator that is easy to observe from a wide variety of angles, distances and light intensities.

Another object of this invention to provide a levelling instrument which is equally suitable for both levelling and plumbing objects when orientated in either an up, down, right or left direction.

It is another object of this invention to provide a levelling instrument wherein a weighted pendulum mirror is rotatable about a light source to project a constant vertical light beam.

It is a specific object of this invention to provide a levelling instrument wherein a transparent conduit, partially filled with mercury, surrounds a light source, whereby the mercury flows in the conduit in response to the position of the instrument to provide a constant vertical light beam.

A further object of this invention is to provide a lens system, perferably with a focusing system, comprising a continuous transparent conduit surrounding the light which is partially filled with an opaque liquid and is adapted to transmit light from the light source to the indicator only when the reference surface is plumb or level.

In an embodiment, therefore, the present invention provides a levelling instrument having means for readily determining a level or plumb position. This levelling instrument includes a body member having a reference surface and a light source positioned within the body member. A reflecting surface, rotatable around the light source, is positioned within the body and is adapted to reflect light in a vertical direction irrespective of the position of the reference surface. This reflecting surface can comprise a pendulum mirror mounted on a bearing race positioned in the body member or, in a predetermined embodiment, the reflecting surface can comprise a continuous transparent arcuate conduit surrounding the light source partially filled with mercury and adapted to contain a clear bubble for the transmission of light in a vertical direction. A level position is indicated by an indicator which is responsive to the light reflected from the rotatable reflecting surface is when the reference surface is in a level or plumb position. The light reflected from the rotatable reflecting surface is focused and directed at the indicator thereby activating the indicator only when the reference surface is level or plumb, whereby a level position is readily discernable by the activation of the indicator.

In a more limited embodiment, the light reflected from the rotatable reflecting surface is focused on the indicator by a lens positioned between the light and indicator when the reference surface is in a level or plumb condition. Preferably a continuous transparent arcuate conduit surrounds the lens and light source and it is partially filled with an opaque liquied and contains a clear bubble. The clear bubble transmits light from the light source to the indicator only when the reference surface is in a plumb or level condition.

Other objects, embodiments and a more detailed description of the foregoing embodiments will be found in the following more detailed description of the present invention.

BRIEF DESCRIPTION OF THE DRAWINGS

FIG. 1 is a side elevational view, in partial section, of a levelling instrument incorporating an embodiment of the invention.

FIG. 2 is a vertical sectional view taken along section lines 2—2 of FIG. 1 showing the orientation of the light source, the lens, the rotating mirror mechanism and the indicating buttons.

FIG. 3 is a detailed perspective view of the rotating mirror mechanism.

FIG. 4 is a detailed elevational view of the rotating mirror mechanism taken along section line 4—4 of FIG. 2.

FIG. 5 is a detailed elevational view of the lens, the indicators and the circular liquid tube.

FIG. 6 is a detailed vertical sectional view of the circular liquid tube taken along section line 6—6 of FIG. 5.

FIGS. 7 and 8 are diagrams indicating the operation of the levelling instrument of FIG. 1 when in non-level conditions.

FIG. 9 is a side elevational view, in partial section, of a levelling instrument incorporating a preferred embodiment of the invention.

FIG. 10 is a vertical sectional view taken along section line 10-10 of FIG. 9.

FIGS. 11 and 12 are diagrams indicating the operation of the levelling instrument of FIG. 9 when in non-level conditions.

FIG. 13 is a schematic view of a complete levelling instrument incorporating the invention.

DETAILED DESCRIPTION OF THE DRAWINGS

Referring to FIG. 1 there is illustrated a level 1a, in partial section, showing levelling mechanism 1 which comprises the present invention. As illustrated in FIG. 13, level 1a has leveling mechanism 1 positioned in the center thereof by screws or other fastening means 16 and is an elongated beam of conventional design used in levelling instruments having reference surfaces 18 and 18a. The body member of level 1a may be constructed of suitable material including aluminum or plastic as desired and has parallel reference surfaces 18 and 18a thereon. The level or plumb of a given object is determined by placing reference surface 18 or 18a against the object in a manner known to the art.

Referring to FIGS. 1 and 2, light 2 powered by battery 25 and activated by on-off switch 26 is mounted in light socket 3 and is positioned in the middle of level 1 within the body member. Light 2 provides a source of light to activate indicators 12, 13 and 14 when reference surface 18 or 18a is positioned against an object and reference surface 18 lies above reference surface 18a. Indicator 13 is adapted to indicate a level position and indicators 12 and 14 adapted to indicate a right or left tilt respectively. Mirror 4 which can have either a circular or parabolic reflecting surface surrounds light 2 at the bottom and both sides and is adapted or focused to project light in a constant vertical direction. Mirror 4 is mounted on an inner race 6 which rotates around an outer race 8 on ball bearings 7. A weight 5 is positioned on the bottom of mirror 4 preferably in the center thereof so that the mirror functions as a pendulum. This arrangement is shown in detail in FIGS. 3 and 4. In other words, irrespective of the position of level 1a, mirror 4 will rotate in conjunction with inner race 6 and will always reflect the light from light 2 in a generally vertical direction. Therefore, when reference surface 18 a lies above reference surface 18, mirror 4 will rotate via inner race 6 and reflect light from light 2 in the direction of indicators 12b, 13b or 14b. Similarly, when reference surfaces 18 and 18a lie in a plumb position, mirror 4 via inner race 6 will rotate and reflect the light from light 2 towards indicators 12a, 13a, 14a or 12c, 13c and 14c depending on the right or left orientation of reference surfaces 18 and 18a.

Again referring to FIGS. 1 and 2, a lens 9 is positioned directly above light 2 when reference surface 18 is level and directs the light reflected by mirror 4 from light 2 towards indicator 13 only when reference surface 18 is in a level position. When level 1a is not in a substantially level (or plumb) position, lens 9 is positioned so that light will not be reflected towards any of the indicators. Further, since the light reflected from mirror 4 is reflected in a vertical direction, and the indicators 12, 13 and 14 face in a horizontal direction, the light must be deflected outward by mirror 11 towards the indicator lights.

A continuous transparent liquid conduit 10 surrounds mirror 4, light 2 and lens 9 and is manufactured from a suitable transparent material such as clear glass or plastic and is partially filled with an opaque liquid 17. Liquid conduit 10 is a modified circular tube wherein the four sides are of circular configuration and have a large radius such as, for example, a radius of about 480 inches. Bubble 15 is formed in liquid path 10 by the incomplete filling of the path with the opaque liquid. Bubble 15 functions much the same as a bubble in a liquid filled vial in a conventional level. When the reference surface 18 is in a level position, bubble 15 lies in the direct path between light 2 and indicator 13 (which indicates a level position). This allows the light to pass directly to indicator 13 without activating either indicators 12 and 14. Any light rays which may pass through lens 9 and which are not directed directly at indicator 13 are intercepted by opaque liquid 17 thereby selectively activating indicator 13. This configuration is detailed in FIG. 5. As indicated conduit 10 can be manufactured out of the conventional transparent plastic material such as acrylic plastic or glass. The opaque liquid contained within conduit 10 must be of a relatively non-wetting nature so that when the level is placed in a level position, there will be no liquid adhereing to the interior walls of conduit 10 thereby interfering with its light transmission properties. A suitable liquid having this property is mercury. Experimentation has indicated that the best results are obtained when liquid conduit 10 is completely flat on its bottom or inside surface but is slightly curved on its top or outside surface and the sides are rounded as illustrated in FIG. 6. Liquid conduit 10 can be filled by closeable opening 10a communicating with the conduit.

Indicator lights 12, 13 and 14 are conventional, light activated reflecting surfaces known to the art and can comprise a beaded plastic reflector surface or a ground glass surface. Preferably, each of the respective indicators are of different color; for example, indicator light 12 could be red, thus indicating an inclination to the right, reference light 13 could be white, indicating a true level or plumb condition and indicator 14 could be green indicating an inclination to the left.

In actual operation, when the levelling instrument is in a level position, light generated by light 2 is reflected by mirror 4 to lens 9 where a concentrated light beam is formed. Preferably mirror 4 has a parabolic reflective surface which serves to focus the light from light 2 and aids lens 9 in focusing the light toward the indicators. This light beam then passes through bubble 15 in liquid 17 and is reflected horizontally outward by mirror 11 before it impinged upon indicator 13 thus indicating a level condition. Since, as indicated, indicator 13 faces horizontally outward, mirror 11 is inclined at a 45° angle to the direction of the light ray thereby deflecting the light horizontally outward through indicator 13.

When the levelling instrument is tilted to the right, as indicated in FIG. 7, the light emanating from light 2 is reflected vertically upward through lens 9. However, since the instrument is not now in a level position, center indicator 13 no longer lies immediately above the vertical light beam. Similarly, bubble 15 has moved to the left and now lies immediately above the vertical light beam from light 2 and allows the light to selectively actuate indicator 12. Opaque liquid 17 prevents any light passing through lens 9 from activating level indicator 13. In a similar manner, as illustrated in FIG. 8, when the levelling instrument is tilted to the left, the light reflected from light 2 by mirror 4 passes through lens 9 and the bubble 15 shifts toward the right and activates indicator 14. Preferably, indicators 12 and 14 are so positioned that they are activated when the reference surfaces are in close proximity to a level position to the exclusion of the activation of level indicator 13. This allows the user of the instrument to anticipate when the object he is levelling is coming in close proximity to a level condition. The same mode of operation applies to the activation of indicators 12a, 13a and 14a; 12b, 13b, and 14b; and, 12c, 13c, and 14c depending on the exact position of the levelling instrument.

Illustrated in FIGS. 9 through 12 is a preferred configuration of the rotatable mirrored surface. Referring to FIGS. 9 and 10, light 2 is surrounded by a transparent circular conduit 22. Preferably conduit 22 has a rectangular cross section and the lateral portion of the curved reflecting surface is not curved which has a closeable opening 22a therein for filling the conduit. Conduit 22 is partially filled with mercury thereby forming bubble 27 therein. The mercury forms a reflective surface within transparent conduit 22, thereby converting the transparent conduit into a mirror. As the level is placed in various positions, the mercury flows within the continuous closed path of the conduit and serves to function as a rotating reflective surface. Since mercury is a liquid, it will always seek its lowest level within conduit 22 and, as a result, moves bubble 27 and continues to reflect the light in a relatively constant vertical direction. Liquid conduit 10' is circular in FIGS. 9 and 10 for ease of construction, however, the same configuration as described in FIGS. 1 through 8 may be used. Indicators 12, 13 and 14 are identical to those described in relation to FIGS. 1 through 8. Lens 21 is positioned between conduit 10' and conduit 22 and serves the same function as lens 9 in FIGS. 1 through 8; namely, to focus the light reflected by the mercury in conduit 22 towards level indicator 13. In the embodiment illustrated, in FIGS. 9 and 10, the mirrored surface 23, conduit 10' and lens 21 are all formed from a unitary molded plastic piece for ease of construction and installation. Wire channel 28 provides a path for the wires connecting light 2 with battery 25. The front of the levelling unit is covered by a detachable access plate 29 to allow changing of bulb 2.

In operation, the light from light 2 is reflected by the mercury contained in transparent conduit 22 vertically upward through bubble 27, lens 21 and bubble 15' and is then reflected horizontally outwards by mirror surface 23 towards indicator 13. In the configuration illustrated in FIG. 10, the indicators are positioned on either face of the levelling instrument and mirror 23 has two sides, each at right angles to each other and positioned so that the light reflected by the mercury in transparent conduit 22 is directed towards the exact corner of mirrored surface 23. As a result, the light is reflected in both a left and right horizontal direction in equal amounts and activates the indicators on both faces of the instrument. This configuration can also be utilized with the rotating mirror embodiment illustrated in FIG. 2 and similarly, the mirror configuration illustrated in FIG. 2 can be utilized in the mercury reflector embodiment illustrated in FIG. 9.

The operation of the embodiment illustrated in FIG. 9 is analogous to the operation illustrated in FIGS. 7 and 8. Referring to FIG. 11 there is illustrated the levelling device 1 when tilted slightly (i.e., up to about 5° from level) to the right. When in this position, the light from light 2 is reflected by the mercury in transparent conduit 22 and bubble 27, lens 21 and bubble 15 to activate indicator 12. The opaque liquid in conduit 10 prevents any of the light rays from scattering and activating the adjacent indicators 13 and 14. Similarly, when the levelling instrument is tilted towards the left, as illustrated in FIG. 12, light from light 2 is reflected vertically upwards and passes through bubble 27, lens 21 and bubble 15. After being reflected by mirror 23, the light activates indicator 14 indicating that the levelling instrument is not in a level position but is in close proximity thereto. As discussed in relation to FIGS. 7, 8 and 11, the opaque liquid in conduit 17 prevents any light beam from impinging on indicators 12 and 13. When the levelling instrument is in a perfectly level position as is illustrated in FIG. 9, the light from light 2 passes directly upward through lens 21, bubbles 15' and 17 to activate indicator 13 to indicate a level position.

While I have shown a presently preferred embodiment of my invention, it must be understood that the invention is not limited to the particular embodiments illustrated since it may be otherwise embodied within the scope of the following claims. For example, the light reflected by the various rotating reflective surfaces can impinge on light responsive cells such as photoelectric cells which, in turn, are connected to a suitable signal means to indicate when light of a predetermined intensity is impinging thereon. Similarly, an audible signal or other type of signal means may be provided by means obvious to those trained in the art. In another alternate embodiment, the lens could be positioned between the light source and the mercury containing reflective conduit or between the opaque liquid conduit and the reflective indicators. However, for ease of construction, I prefer to position the lens between the rotating mirrored surface and the opaque liquid conduit.

I claim as my invention:

1. A levelling instrument having means for readily determining a level or plumb position which comprises, in combination:
   a. a body member having a reference surface;
   b. a source of light positioned within the body member;
   c. a reflecting surface rotatable about the light source, said reflecting surface adapted to reflect light in a vertical direction irrespective of the position of the reference surface;
   d. a first indicator responsive to light reflected from the reflective surface when the reference surface is in a level or plumb position; and,
   e. means for focusing and directing the light reflected in a vertical position by the reflecting surface to activate the indicator only when the reference surface is level or plumb whereby a level position is readily discernible by the activation of the indicator.

2. A levelling instrument according to claim 1 wherein said reflecting surface comprises a solid reflective mirror with mirrored inner curved surfaces that encompass the bottom and sides of the light source.

3. A levelling instrument according to claim 2 wherein said mirror is weighted at the bottom to provide a rotatable pendulum mirror to reflect the light in a vertical direction.

4. A levelling instrument according to claim 2 wherein said mirror is rotatable on a bearing race positioned in the body member.

5. A levelling instrument according to claim 1 wherein said focusing means includes a lens positioned between the light and the indicator to focus light on the indicator when the reference surface is level or plumb.

6. A levelling instrument according to claim 1 wherein said focusing means includes a continuous transparent arcuate conduit surrounding the light source; said conduit partially filled with an opaque liquid and adapted to contain a clear bubble to transmit light from the light source to the indicator only when the reference surface is plumb or level.

7. A levelling instrument according to claim 6 wherein said arcuate conduit has a generally flat inner bottom wall and curved inner side and top walls.

8. A levelling instrument according to claim 1 wherein
   a. said reflecting surface comprises a solid reflective mirror with a mirrored inner curved surface that encompasses the bottom and sides of the light source weighted at the bottom to provide a rotatable pendulum mirror and adapted to reflect the light in a vertical direction, said mirror rotatable about a bearing race positioned in the body member; and,
   b. said focusing means include a lens positioned between the light and indicator to focus light on the indicator when the reference surface is level or plumb and a continuous transparent arcuate conduit surrounding the lens and light source; said conduit partially filled with an opaque liquid and adapted to contain a clear bubble to transmit light from the light source to the indicator only when the reference surface is plumb or level.

9. A levelling instrument according to claim 1 which includes a second indicator adapted to be activated by the light reflected by the reflecting surface only when the reference surface is not in a plumb or level position and is in close proximity to the level or plumb position.

10. A levelling instrument according to claim 9 wherein said first and second indicator are of a different color.

11. A levelling instrument according to claim 1 wherein said reflecting surface comprises a continuous transparent arcuate conduit surrounding the light source; said conduit partially filled with mercury and adapted to contain a clear bubble for the transmission of light in a vertical direction.

12. A levelling instrument according to claim 11 wherein said conduit has a rectangular cross section and the mercury encompasses the bottom and sides of the light source.

13. A levelling instrument according to claim 11 wherein said focusing means includes a lens positioned between the light and indicator adapted to focus light on the indicator when the reference surface is level or plumb and a continuous transparent arcuate conduit surrounding the lens and light source; said conduit partially filled with an opaque liquid and adapted to contain a clear bubble to transmit light from the light source to the indicator only when the reference surface is plumb or level.

14. A levelling instrument according to claim 11 wherein said arcuate conduit is a circular conduit.

15. A levelling instrument according to claim 1 wherein said indicator is positioned to indicate activation of the indicator when viewed from a horizontal direction and said focusing means includes a mirrored surface adapted to direct the light vertically reflected by the reflecting surface toward the indicator.

* * * * *